United States Patent
Homma

(10) Patent No.: US 8,980,495 B2
(45) Date of Patent: Mar. 17, 2015

(54) FUEL CELL SYSTEM

(75) Inventor: Hiroki Homma, Asaka (JP)

(73) Assignee: Honda Motor Co., Ltd., Tokyo (JP)

(*) Notice: Subject to any disclaimer, the term of this patent is extended or adjusted under 35 U.S.C. 154(b) by 818 days.

(21) Appl. No.: 12/301,268

(22) PCT Filed: May 16, 2007

(86) PCT No.: PCT/JP2007/060474
§ 371 (c)(1),
(2), (4) Date: Nov. 18, 2008

(87) PCT Pub. No.: WO2007/130078
PCT Pub. Date: Nov. 29, 2007

(65) Prior Publication Data
US 2009/0208799 A1    Aug. 20, 2009

(30) Foreign Application Priority Data
May 18, 2006   (JP) ................................ 2006-138607

(51) Int. Cl.
| H01M 8/04 | (2006.01) |
| H01M 8/06 | (2006.01) |
| H01M 8/24 | (2006.01) |
| H01M 8/12 | (2006.01) |

(52) U.S. Cl.
CPC ...... *H01M 8/04022* (2013.01); *H01M 8/04223* (2013.01); *H01M 8/0612* (2013.01); *H01M 8/0625* (2013.01); *H01M 8/12* (2013.01); *H01M 8/247* (2013.01); *H01M 8/2475* (2013.01); *H01M 8/248* (2013.01); *Y02E 60/50* (2013.01)

USPC ............ 429/441; 429/423; 429/440; 429/470

(58) Field of Classification Search
USPC .................. 429/416, 434, 423, 470, 440, 441
See application file for complete search history.

(56) References Cited

U.S. PATENT DOCUMENTS

| 4,597,362 | A | * | 7/1986 | Daudet et al. ................. 122/4 D |
| 4,640,344 | A | * | 2/1987 | Pravda ............................ 165/86 |
| 5,998,053 | A | * | 12/1999 | Diethelm ....................... 429/429 |
| 6,586,125 | B2 | * | 7/2003 | Takeda et al. ................. 429/425 |
| 6,998,096 | B2 | * | 2/2006 | Ishikawa ........................... 48/94 |
| 2002/0004152 | A1 | * | 1/2002 | Clawson et al. ............... 429/17 |
| 2004/0146763 | A1 | | 7/2004 | Pondo et al. |
| 2005/0019633 | A1 | * | 1/2005 | Tanaka ............................ 429/26 |
| 2005/0136307 | A1 | * | 6/2005 | Tsunoda ......................... 429/26 |
| 2005/0142424 | A1 | | 6/2005 | Homma et al. |

FOREIGN PATENT DOCUMENTS

| DE | 19852853 A1 | 7/1999 |
| JP | 2005-166439 | 6/2005 |
| WO | WO-01/95409 A2 | 12/2001 |

* cited by examiner

*Primary Examiner* — Ula C. Ruddock
*Assistant Examiner* — Thomas H. Parsons
(74) *Attorney, Agent, or Firm* — Nelson Mullins Riley & Scarborough LLP; Anthony A. Laurentano

(57) ABSTRACT

A fuel cell system includes a fuel cell stack, a heat exchanger, a reformer, and a combustor. The combustor is provided around the heat exchanger. A combustion gas path for supplying a combustion gas produced in the combustor to the heat exchanger and an exhaust gas path for supplying an exhaust gas discharged from the fuel cell stack after consumption in power generation reaction are merged at a merger section provided on an upstream side of a heat medium inlet of the heat exchanger.

8 Claims, 10 Drawing Sheets

FUEL CELL SYSTEM

RELATED APPLICATIONS

This application is a 35 U.S.C. 371 national stage filing of International Application No. PCT/JP2007/060474, filed 16 May 2007, which claims priority to Japan Patent Application No. 2006-138607 filed on 18 May 2006 in Japan. The contents of the aforementioned applications are hereby incorporated by reference.

TECHNICAL FIELD

The present invention relates to a fuel cell system including a fuel cell stack formed by stacking a plurality of fuel cells. Each of the fuel cells is formed by stacking an electrolyte electrode assembly and a separator. The electrolyte electrode assembly includes an anode, a cathode, and an electrolyte interposed between the anode and the cathode.

BACKGROUND ART

Typically, a solid oxide fuel cell (SOFC) employs an electrolyte of ion-conductive solid oxide such as stabilized zirconia. The electrolyte is interposed between an anode and a cathode to form an electrolyte electrode assembly. The electrolyte electrode assembly is interposed between separators (bipolar plates). In use, predetermined numbers of the electrolyte electrode assemblies and the separators are stacked together to form a fuel cell stack.

The operating temperature of the fuel cell is high, about 800° C. Therefore, at the time of starting operation of the fuel cell stack, it is desirable to heat the fuel cell stack to a desired temperature rapidly using a combustor. Normally, the combustor is provided on a side of the fuel cell stack where the oxygen-containing gas is supplied, or on a side of the fuel cell stack where the exhaust gas is discharged.

However, in the structure where the combustor is provided on the side where the oxygen-containing gas is supplied, the hot combustion gas produced by combustion in the combustor directly flows into the fuel cell stack. Therefore, the separators tend to be corroded easily by the hot combustion gas, and carbon in the combustion gas adheres to the separators or the membrane electrode assembly.

In an attempt to address the problems, structure of providing the combustor on the side of the fuel stack where the exhaust gas is discharged may be adopted. For example, Japanese Laid-Open Patent Publication No. 2005-166439 discloses a fuel cell system shown in FIG. 10. The fuel cell system 10 includes a fuel cell 1 having an air electrode 1*a* and a fuel electrode 1*b*. The air 2 as an oxygen-containing gas is supplied to the air electrode 1*a*, and a fuel gas 3 is supplied to the fuel electrode 1*b*.

On the side of the fuel cell 1 where the off gas is discharged from the fuel electrode 1*b*, an exhaust gas combustor 4 for burning the off gas is provided, and the combustion gas discharged from the exhaust gas combustor 4 is supplied to a heat exchanger 5, and the air 2 is heated before it is supplied to the air electrode 1*a*. In a supply line of the fuel gas 3, a start up combustor 6 for supplying the reducing gas produced by incomplete combustion to the fuel electrode 1*b* is provided.

However, in the conventional technique, since the two combustors, i.e., the exhaust gas combustor 4 and the start up combustor 6 are provided in the fuel cell system, the overall size of the fuel cell system is large.

Further, the exhaust gas combustor 4 is provided on the exhaust gas path of the fuel cell 1, and always exposed to the hot exhaust gas. Thus, durability of the exhaust gas combustor 4 is low. Further, at the time of starting operation of the fuel cell system, since the temperature of the exhaust gas discharged from the fuel cell 1 varies, it is extremely difficult to maintain the temperature of the combustion gas discharged from the exhaust gas combustor 4 in a certain range of the temperature.

Disclosure of Invention

The present invention solves the above problems, and an object of the present invention is to provide a fuel cell system having simple structure in which durability of the combustor is improved effectively, and heat efficiency is improved suitably.

The present invention relates to a fuel cell system including a fuel cell stack, a heat exchanger, a reformer, and a combustor. The fuel cell stack is formed by stacking a plurality of fuel cells. Each of the fuel cells is formed by stacking an electrolyte electrode assembly and a separator. The electrolyte electrode assembly includes an anode, a cathode, and an electrolyte interposed between the anode and the cathode. The heat exchanger heats an oxygen-containing gas using a heat medium before the oxygen-containing gas is supplied to the fuel cell stack. The reformer reforms a raw fuel chiefly containing hydrocarbon to produce a fuel gas to be supplied to the fuel cell stack. The combustor burns the raw fuel to produce a combustion gas.

A fluid unit including at least the heat exchanger and the reformer are provided at one end of the fuel cell stack in the stacking direction. The combustor is provided around the heat exchanger. Further, the fuel cell system includes a combustion gas path for supplying the combustion gas produced in the combustor to the heat exchanger as the heat medium, an exhaust gas path for supplying an exhaust gas discharged from the fuel cell stack after consumption in power generation reaction to the heat exchanger as the heat medium, and a merger section provided on an upstream side of the heat medium inlet for supplying the heat medium to the heat exchanger. The combustion gas path and the exhaust gas path are merged at the merger section.

In the present invention, the combustor is provided around the heat exchanger of the fluid unit. Therefore, by the heat transmitted or radiated from the combustor, heat insulation efficiency of the fluid unit including the heat exchanger is improved effectively. Thus, it is possible to reduce the amount of heat released from the fluid unit, and improvement in heat efficiency is achieved advantageously.

Further, the combustion gas produced in the combustor and the exhaust gas discharged from the fuel cell stack are mixed on the upstream side of the heat medium inlet of the heat exchanger as the heat medium. In the structure, the temperature of the heat medium supplied to the heat exchanger is regulated suitably and accurately. Further, the control of the combustor becomes simple and highly accurate at one effort. Moreover, durability of the heat exchanger is improved, and the design conditions of the heat exchanger are eased advantageously.

Further, the combustor is not exposed to the hot exhaust gas discharged from the fuel cell stack, and durability of the combustor is improved advantageously. Moreover, the temperatures and the flow rates of the raw fuel and the oxygen-containing gas as conditions of operating the fuel cell system can be maintained substantially at certain levels. Accordingly, stable combustion is performed reliably.

BEST MODE FOR CARRYING OUT THE INVENTION

Figure 1:
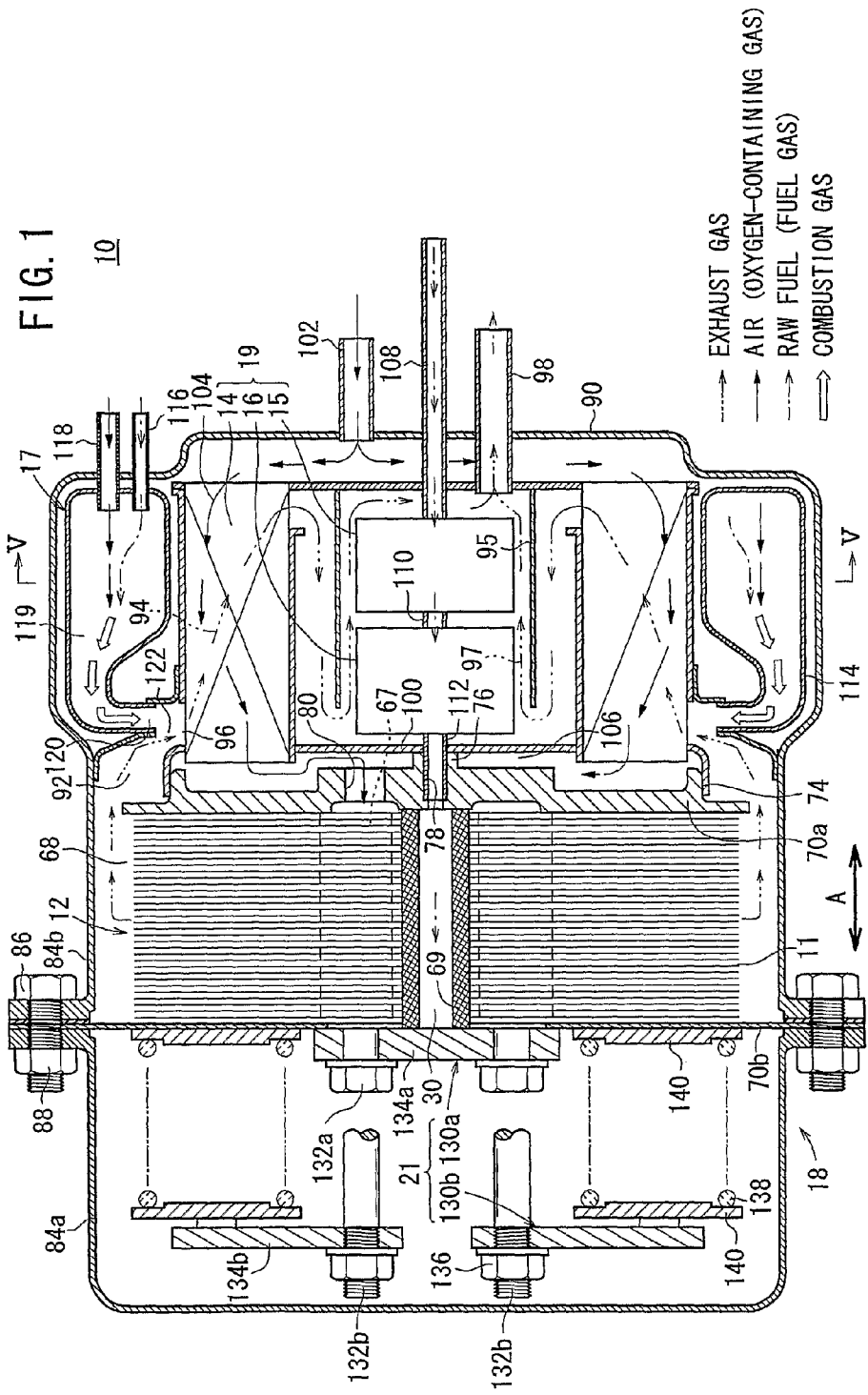
FIG. 1 is a partial cross sectional view showing a fuel cell system according to a first embodiment of the present invention.
Figure 2:
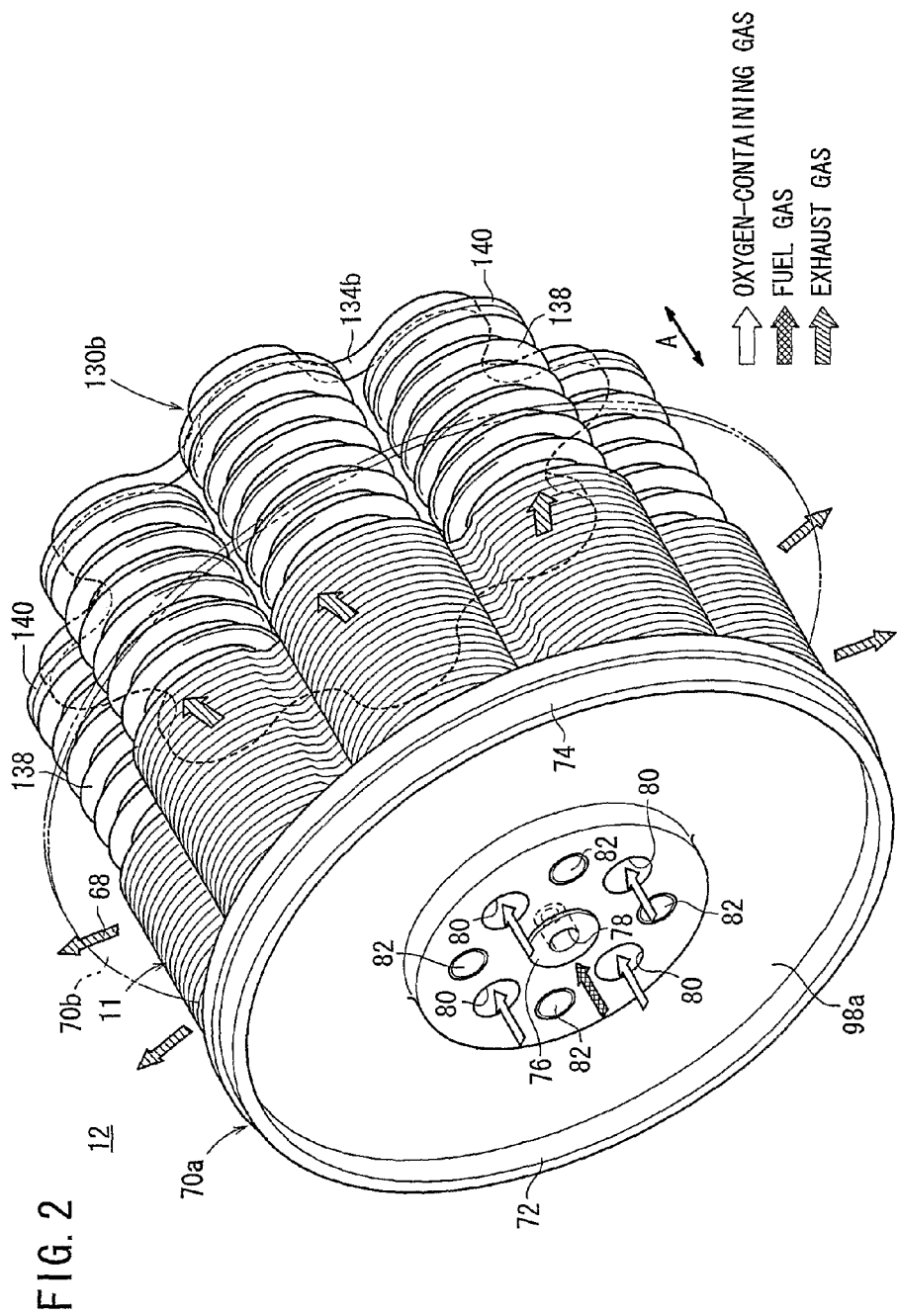
FIG. 2 is a perspective view schematically showing a fuel cell stack of the fuel cell system.

FIG. 1 is a partial cross sectional view showing a fuel cell system 10 according to a first embodiment of the present invention. FIG. 2 is a perspective view schematically showing a fuel cell stack 12 formed by stacking a plurality of fuel cells 11 of the fuel cell system 10 in a direction indicated by an arrow A.

The fuel cell system 10 is used in various applications, including stationary and mobile applications. For example, the fuel cell system 10 is mounted on a vehicle. The fuel cell system 10 includes a fuel cell stack 12, an evaporator 15, a reformer (or preliminary reformer) 16, a combustor 17, and a casing 18. The heat exchanger 14 heats an oxygen-containing gas before it is supplied to the fuel cell stack 12. The evaporator 15 evaporates water. The reformer 16 uses water vapor (steam) and a raw fuel (e.g., city gas) chiefly containing hydrocarbon for steam reforming of the raw fuel. The combustor 17 burns the raw fuel to produce a combustion gas. The fuel cell stack 12, the heat exchanger 14, the evaporator 15, the reformer 16, and the combustor 17 are disposed in the casing 18.

In the casing 18, a fluid unit 19 including at least the heat exchanger 14, the evaporator 15, and the reformer 16 is disposed on one side of the fuel cell stack 12 in the stacking direction, and a load applying mechanism 21 for applying a tightening load to the fuel cells 11 in the stacking direction indicated by the arrow A is disposed on the other side of the fuel cell stack 12 in the stacking direction. The fluid unit 19 and the load applying mechanism 21 are provided symmetrically with respect to the central axis of the fuel cell stack 12.

In the fluid unit 19, the substantially cylindrical reformer 16 is provided inside the ring shaped heat exchanger 14, near the fuel cell stack 12. The reformer 16 and the evaporator 15 are provided adjacent to each other in the direction indicated by the arrow A.

Figure 3:
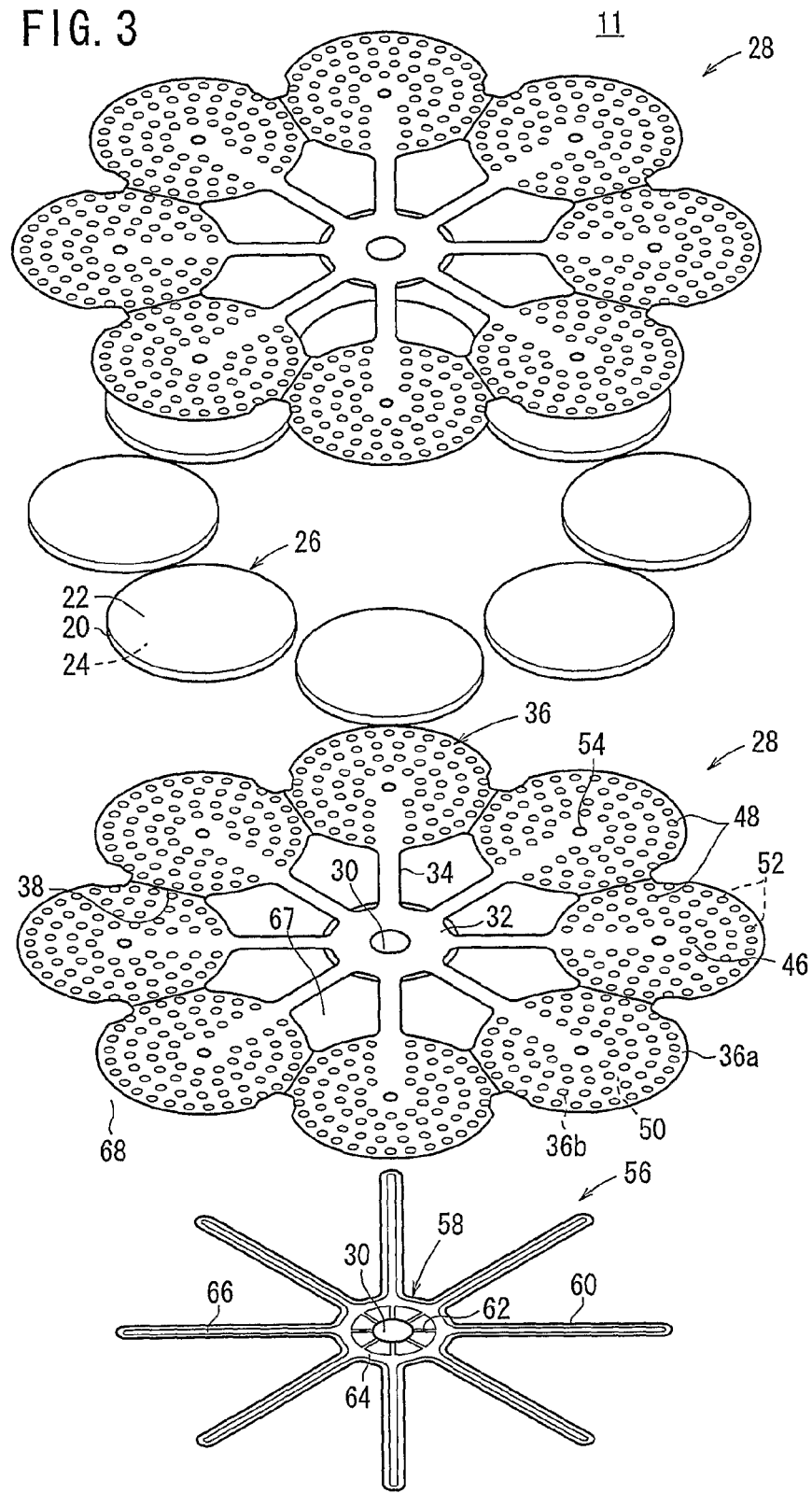
FIG. 3 is an exploded perspective view showing a fuel cell of the fuel cell stack.

The fuel cell 11 is a solid oxide fuel cell (SOFC). As shown in FIG. 3, the fuel cell 11 includes electrolyte electrode assemblies 26 each having a circular disk shape. Each of the electrolyte electrode assemblies 26 includes a cathode 22, an anode 24, and an electrolyte (electrolyte plate) 20 interposed between the cathode 22 and the anode 24. A barrier layer (not shown) is provided at least at the inner circumferential edge of the electrolyte electrode assembly 26 (center of the separator 28) for preventing the entry of the oxygen-containing gas. For example, the electrolyte 20 is made of ion-conductive solid oxide such as stabilized zirconia.

A plurality of, e.g., eight electrolyte electrode assemblies 26 are sandwiched between a pair of separators 28 to form the fuel cell 11. The eight electrolyte electrode assemblies 26 are aligned along a virtual circle concentric with a fuel gas supply passage 30 extending through the center of the separators 28.

For example, each of the separators 28 comprises a single metal plate of, e.g., stainless alloy or a carbon plate. The separator 28 has a first small diameter end portion 32. The fuel gas supply passage 30 extends through the center of the first small diameter end portion 32. The first small diameter end portion 32 is integral with circular disks 36 each having a relatively large diameter through a plurality of first bridges 34. The first bridges 34 extend radially outwardly from the first small diameter end portion 32 at equal angles (intervals). The circular disk 36 and the electrolyte electrode assembly 26 have substantially the same size. The adjacent circular disks 36 are separated by a slit 38.

Each of the circular disks 36 has first protrusions 48 on its surface 36a which contacts the anode 24. The first protrusions 48 form a fuel gas channel 46 for supplying the fuel gas along an electrode surface of the anode 24. Each of the circular disks 36 has second protrusions 52 on its surface 36b which contacts the cathode 22. The second protrusions 52 form an oxygen-containing gas channel 50 for supplying the oxygen-containing gas along an electrode surface of the cathode 22.

Figure 4:
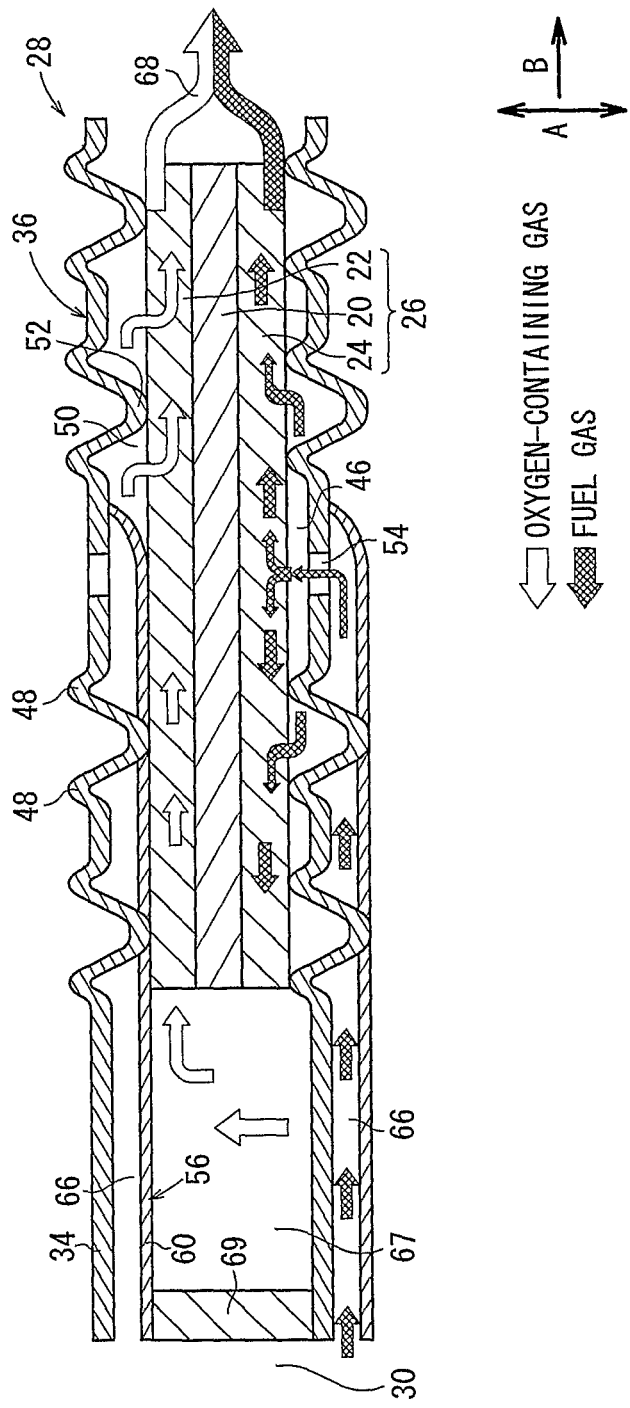
FIG. 4 is a cross sectional view schematically showing operation of the fuel cell.

As shown in FIG. 4, the first and second protrusions 48, 52 protrude in opposite directions. The first protrusions 48 are ring shaped protrusions, and the second protrusions 52 are mountain shaped protrusions. The second protrusions (mountain shaped protrusions) 52 are surrounded by the first protrusions (ring shaped protrusions) 48.

As shown in FIGS. 3 and 4, a fuel gas inlet 54 is provided in each of the circular disks 36 for supplying the fuel gas to the fuel gas channel 46. The position of the fuel gas inlet 54 is determined such that uniform distribution of the fuel gas is achieved. For example, the fuel gas inlet 54 is positioned at substantially the center of the circular disk 36.

A channel member 56 is fixed to the separator 28 by brazing or laser welding on a surface facing the cathode 22. As shown in FIG. 3, the channel member 56 includes a second small diameter end portion 58. The fuel gas supply passage 30 extends through the center of the second small diameter end portion 58. Eight second bridges 60 extend radially from the second small diameter end portion 58. Each of the second bridges 60 is fixed to the separator 28, from the first bridge 34 to the fuel gas inlet 54 of the circular disk 36.

A plurality of slits 62 are formed on the second small diameter end portion 58 of the channel member 56. The slits 62 are formed radially on a surface of the second small diameter end portion 58 which is joined to the separator 28. The slits 62 are connected to the fuel gas supply passage 30. Further, the slits 62 are connected to a recess 64 formed in the outer circumferential region of the second small diameter end portion 58. A fuel gas supply channel 66 is formed between the first and second bridges 34, 60. The fuel gas supply channel 66 is connected from the fuel gas supply passage 30 to the fuel gas channel 46 via the slits 62 and the recess 64 through the fuel gas inlet 54.

As shown in FIG. 4, the oxygen-containing gas channel 50 is connected to an oxygen-containing gas supply unit 67. The oxygen-containing gas is supplied in the direction indicated by the arrow B through the space between the inner circumferential edge of the electrolyte electrode assembly 26 and the inner circumferential edge of the circular disk 36. The oxygen-containing gas supply unit 67 extends in the stacking direction inside the circular disks 36 between the first bridges 34.

An insulating seal 69 for sealing the fuel gas supply passage 30 is provided between a pair of separators 28. For example, the insulating seal 69 is made of mica material, or ceramic material. An exhaust gas channel 68 is formed around the circular disks 36 of the fuel cells 11.

As shown in FIGS. 1 and 2, the fuel cell stack 12 includes a plurality of the fuel cells 11 stacked together, and end plates 70a, 70b provided at opposite ends in the stacking direction. Each of the end plates 70a, 70b has a substantially circular disk shape. A ring shaped portion 72 protrudes from the outer circumferential end of the end plate 70a, and a groove 74 is formed around the ring shaped portion 72. A columnar projection 76 is formed at the center of the ring shaped portion 72. The columnar projection 76 protrudes in the same direction as the ring shaped portion 72. A stepped hole 78 is formed at the center of the projection 76.

Holes 80 and screw holes 82 are formed in a same virtual circle around the projection 76. The holes 80 and the screw holes 82 are arranged alternately, and spaced at predetermined angles (intervals). As shown in FIG. 1, the diameter of the end plate 70b is larger than the diameter of the end plate 70a. The end plate 70a is an electrically conductive thin plate.

The casing 18 includes a first case unit 84a containing the load applying mechanism 21 and a second case unit 84b containing the fuel cell stack 12. The joint portion between the first case unit 84a and the second case unit 84b is tightened by screws 86 and nuts 88. A head plate 90 is fixed to the second case unit 84b.

The exhaust gas channel 68 is provided between the outer ends of the stacked fuel cells 11 and the inner surface of the second case unit 84b. The exhaust gas channel 68 is connected to an exhaust gas path 92, and the exhaust gas path 92 is connected to a heat medium inlet 96 for supplying a heat medium to a heat medium channel 94 of the heat exchanger 14. The heat medium channel 94 is connected to an exhaust gas pipe 98 through a heating channel 97 formed by a cylindrical guide plate 95.

The guide plate 95 is provided inside the heat exchanger 14, and around the evaporator 15 and the reformer 16. The heating channel 97 is provided inside the guide plate 95, for heating the evaporator 15 and the reformer 16. The heat exchanger 14 is fixed to the wall plate 100, and the wall plate 100 is supported by the groove 74 formed around the end plate 70a.

An air supply pipe 102 is connected to the head plate 90. The air supply pipe 102 is connected to a chamber 106 formed inside the wall plate 100 through the channel 104 in the heat exchanger 14. The chamber 106 is connected to the oxygen-containing gas supply unit 67 in the fuel cell stack 12 through the holes 80 of the end plate 70a.

A raw fuel supply pipe 108 is connected to the evaporator 15. The raw fuel supply pipe 108 extends to the outside the head plate 90. The evaporator 15 and the reformer 16 are connected through a connection pipe 110. The reformer 16 has a reformed gas supply pipe 112. The reformed gas supply pipe 112 is inserted into a stepped hole 78 of the end plate 70a, and connected to the fuel gas supply passage 30.

Figure 5:
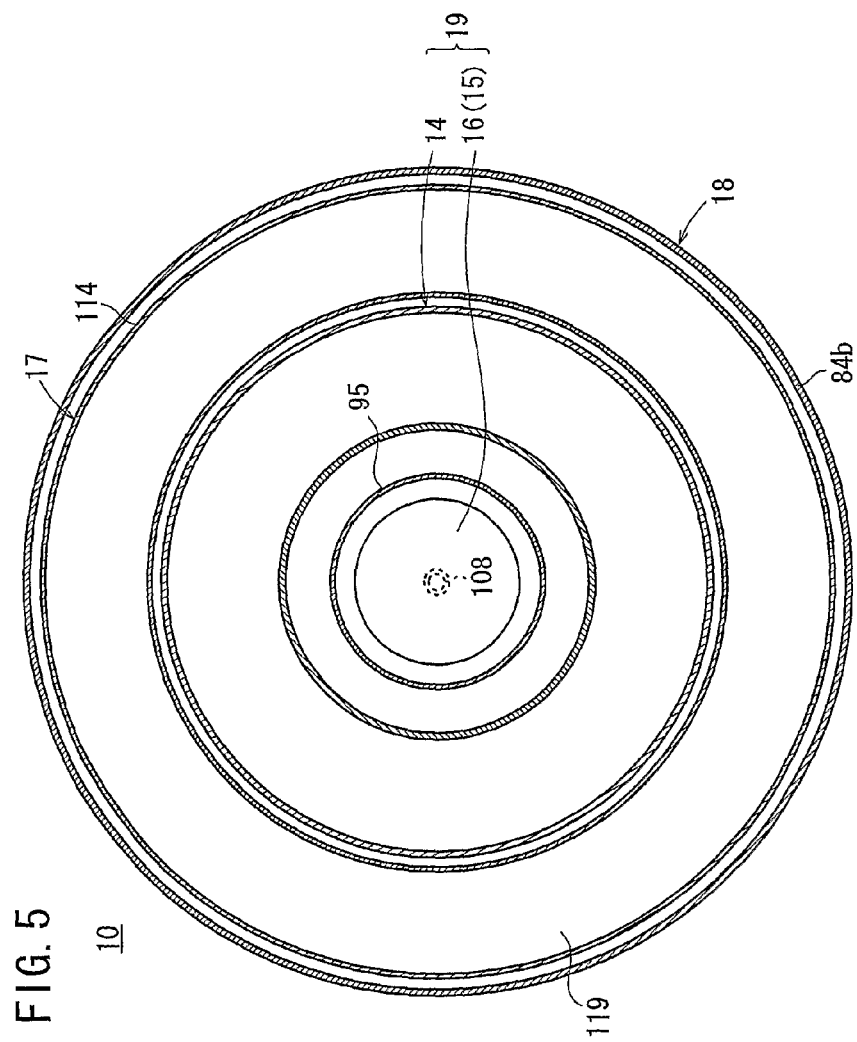
FIG. 5 is a cross sectional view showing the fuel cell system, taken along a line V-V in FIG. 1.

As shown in FIGS. 1 and 5, the combustor 17 has a cover 114, and the thickness of the cover 114 is small in comparison with the second casing unit 84b. The cover 114 is formed in a substantially ring shape around the heat exchanger 14. A raw fuel supply pipe 116 and an air supply pipe 118 are connected to an end of the cover 114. The raw fuel supply pipe 116 and the air supply pipe 118 extend through the head plate 90, and are exposed to the outside.

The combustor 17 has a combustion gas path 120 for supplying a combustion gas produced in the combustion chamber 119 of the combustor 17 to the heat exchanger 14. The combustion gas path 120 and the exhaust gas path 92 are merged at a merger section 122 on the upstream side of the heat medium inlet 96 of the heat exchanger 14 to produce a mixed gas of the combustion gas and the exhaust gas.

The load applying mechanism 21 includes a first tightening unit 130a for applying a first tightening load to a region around (near) the fuel gas supply passage 30 and a second tightening unit 130b for applying a second tightening load to the electrolyte electrode assemblies 26. The second tightening load is smaller than the first tightening load.

The first tightening unit 130a includes short first tightening bolts 132a screwed into screw holes 82 formed along one diagonal line of the end plate 70a. The first tightening bolts 132a extend in the stacking direction of the fuel cells 11, and engage a first press plate 134a. The first tightening bolts 132a are provided in the oxygen-containing gas supply unit 67 extending through the separators 28. The first press plate 134a is a narrow plate, and engages the central position of the separator 28 to cover the fuel gas supply passage 30.

The second tightening unit 130b includes long second tightening bolts 132b screwed into screw holes 82 formed along the other diagonal line of the end plate 70a. Ends of the second tightening bolts 132b extend through a second press plate 134b having a curved outer section. Nuts 136 are fitted to the ends of the second tightening bolts 132b. The second tightening bolts 132b are provided in the oxygen-containing gas supply unit 67 extending through the separators 28. Springs 138 and spring seats 140 are provided in respective circular portions of the second press plate 134b, at positions corresponding to the electrolyte electrode assemblies 26 on the circular disks 36 of the fuel cell 11. For example, the springs 138 are ceramics springs.

Next, operation of the fuel cell system 10 will be described below.

Firstly, as shown in FIG. 1, a raw fuel (methane, ethane, propane, or the like) and, as necessary, water are supplied from the raw fuel supply pipe 108, and an oxygen-containing gas (hereinafter referred to as the "air") is supplied from the air supply pipe 102.

Water is evaporated at the evaporator 15 to produce water vapor. The water vapor and the raw fuel flow through the connection pipe 110, and are supplied to the reformer 16. Thus, at the reformer 16, the fuel gas is produced by steam reforming of the raw fuel. The fuel gas supplied to the fuel gas supply passage 30 of the fuel cell stack 12 moves in the stacking direction indicated by the arrow A, and flows into the fuel gas supply channel 66 of each fuel cell 11 (FIG. 4).

The fuel gas flows along the fuel gas supply channel 66 between the first and second bridges 34, 60, and flows into the fuel gas channels 46 from the fuel gas inlets 54 of the circular disks 36. The fuel gas inlets 54 are formed at substantially central positions of the anodes 24 of the electrolyte electrode assemblies 26. Thus, in each of the electrolyte electrode assemblies 26, the fuel gas is supplied from the fuel gas inlet 54 to substantially the central position of the anode 24, and flows outwardly toward the outer end of the anode 24 along the fuel gas channel 46.

As shown in FIG. 1, the air from the air supply pipe 102 flows through the channel 104 of the heat exchanger 14, and temporarily flows into the chamber 106. The air flows through the holes 80 connected to the chamber 106, and is supplied to the oxygen-containing gas supply unit 67 provided inside the fuel cells 11 (provided at the center of the separators 28). At this time, at the heat exchanger 14, as described later, the exhaust gas discharged to the exhaust gas channel 68 and the hot combustion gas heated at the combustor 17 are mixed to produce a mixed gas, and the mixed gas flows through the heat medium channel 94.

Specifically, in the combustor 17, in particular, at the time of starting operation of the fuel cell system 10, the raw fuel is supplied to the raw fuel supply pipe 116 and the air is supplied to the air supply pipe 118. Thus, the combustion gas produced by combustion in the combustion chamber 119 in the combustor 17 flows through the combustion gas path 120, and is supplied to the merger section 122. Thus, the mixed gas is produced by mixing the combustion gas and the exhaust gas at the merger section 122. Heat exchange between the mixed gas and the air before consumption is performed, i.e., the air is heated to a predetermined fuel cell operating temperature before it is supplied to the fuel cells 11.

The air supplied to the oxygen-containing gas supply unit 67 flows into the space between the inner circumferential edge of the electrolyte electrode assembly 26 and the inner circumferential edge of the circular disk 36 in the direction indicated by the arrow B, and flows toward the oxygen-containing gas channel 50. As shown in FIG. 4, in the oxygen-containing gas channel 50, the oxygen-containing gas flows from the inner circumferential edge (central region of the separator 28) to the other outer circumferential edge (outer circumferential region of the separator 28) of, i.e., from one end to the other end of the cathode 22 of the electrolyte electrode assembly 26.

Thus, in the electrolyte electrode assembly 26, the fuel gas flows from the center to the outer circumferential side on the electrode surface of the anode 24, and the oxygen-containing gas flows in one direction indicated by the arrow B on the electrode surface of the cathode 22. At this time, oxygen ions flow through the electrolyte 20 toward the anode 24 for generating electricity by electrochemical reactions.

In the first embodiment, the combustor 17 is formed around the heat exchanger 14 of the fluid unit 19. Thus, improvement in heat insulating performance of the fluid unit 19 including the heat exchanger 14 is achieved by heat transmitted or radiated from the combustor 17 having a relatively high temperature by combustion. Thus, it is possible to reduce the amount of heat released from the fluid unit 19, and improvement in heat efficiency is achieved.

The exhaust gas discharged from the fuel cell stack 12 is supplied through the exhaust gas channel 68 to the exhaust gas path 92, and the combustion gas discharged from the combustor 17 is supplied to the combustion gas path 120. Thus, the exhaust gas path 92 and the combustion gas path 120 are merged at the merger section 122 provided on the upstream side of the heat medium inlet 96 of the heat exchanger 14.

The combustion gas produced at the combustor 17 and the exhaust gas discharged from the fuel cell stack 12 are mixed at the merger section 122, and then, the mixed gas flows from the heat medium inlet 96 into the heat medium channel 94 of the heat exchanger 14. Thus, the temperature of the heat medium supplied to the heat exchanger 14 is suitably and accurately regulated. Accordingly, the control of the combustor 17 drastically becomes simply and finely. Moreover, durability of the heat exchanger 14 is improved, and the design conditions of the heat exchanger 14 are eased advantageously.

Further, the combustor 17 is not exposed to the hot exhaust gas discharged from the fuel cell stack 12, and durability of the combustor 17 is improved advantageously. Moreover, the raw fuel is supplied to the combustor 17 through the raw fuel supply pipe 116, and the air is supplied to the combustor 17 through the air supply pipe 118. The temperatures and the flow rates of the raw fuel and the oxygen-containing gas as the conditions of operating the fuel cell stack 12 can be maintained substantially at certain levels. Accordingly, stable combustion is performed reliably.

The exhaust gas flows through the heat medium channel 94, and after the heat exchange, the exhaust gas flows into the heating channel 97 by the guidance of the guide plate 95. The reformer 16 and the evaporator 15 are provided at the heating channel 97. Thus, by the heat of the exhaust gas, the reformer 16 and the evaporator 15 are heated suitably. Thus, the waste heat is utilized suitably, and heat efficiency is improved.

At the time of starting operation of the fuel cell system 10, after operation of the fuel cell stack 12 is started, combustion in the combustor 17 is started. Therefore, the combustion gas having a relatively high temperature heats the heat exchanger 14, the reformer 16, and the evaporator 15 rapidly, and then, the combustion gas is discharged from the exhaust gas pipe 98.

After the heat exchanger 14, the reformer 16, and the evaporator 15 are heated to a predetermined temperature, as described above, the raw fuel and the water are supplied to the raw fuel supply pipe 108, and the air is supplied to the air supply pipe 102 to start operation of the fuel cell stack 12. After the fuel cell stack 12 starts the steady operation, combustion by the combustor 17 is stopped. At the heat exchanger 14, heat exchange between the air supplied from the air supply pipe 102 and the exhaust gas discharged from the fuel cell stack 12 is performed. After the oxygen-containing gas is heated to the predetermined temperature, the oxygen-containing gas is supplied to the fuel cell stack 12.

Figure 6:
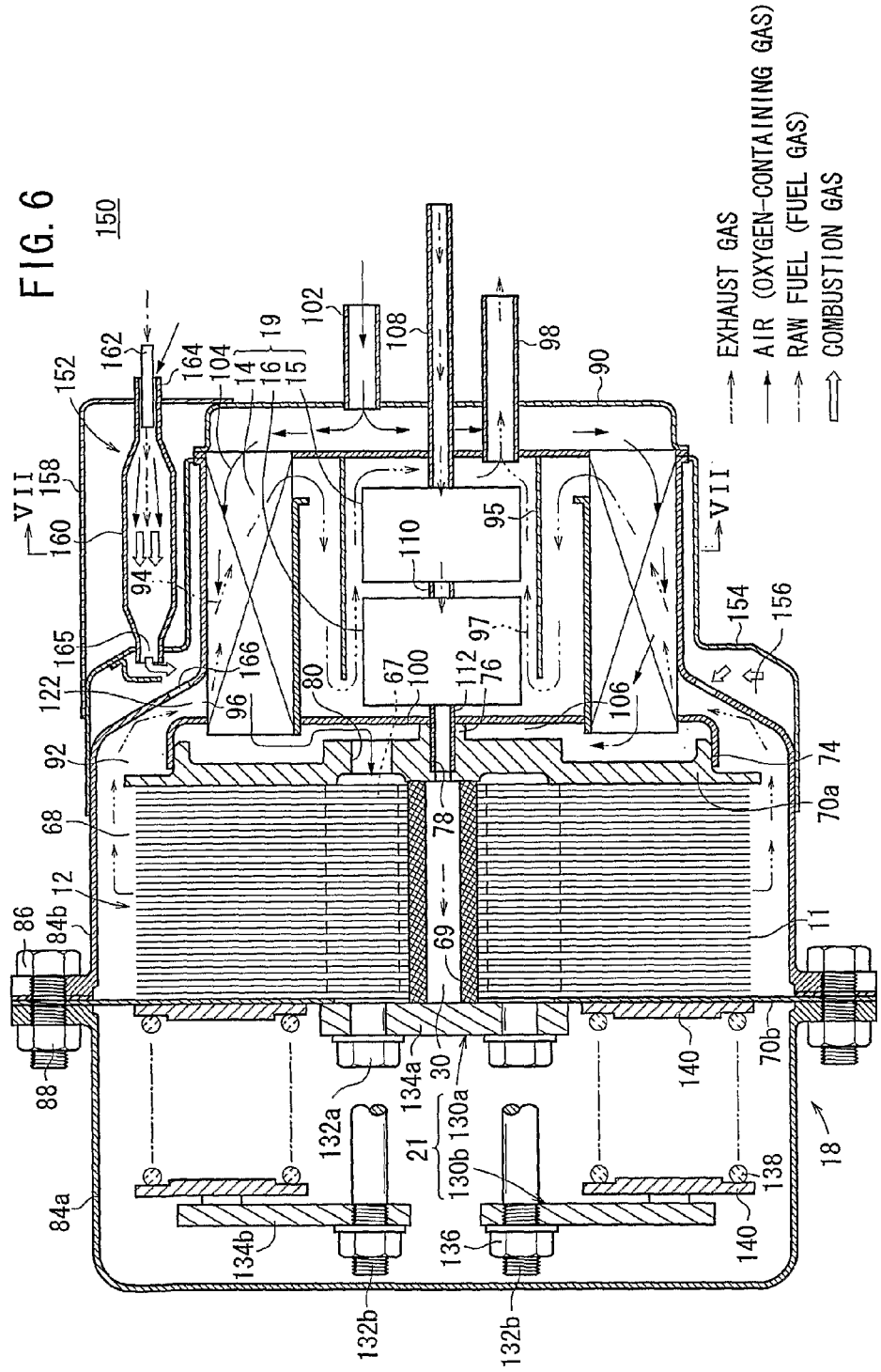
FIG. 6 is a partial cross sectional view showing a fuel cell system according to a second embodiment of the present invention.
Figure 7:
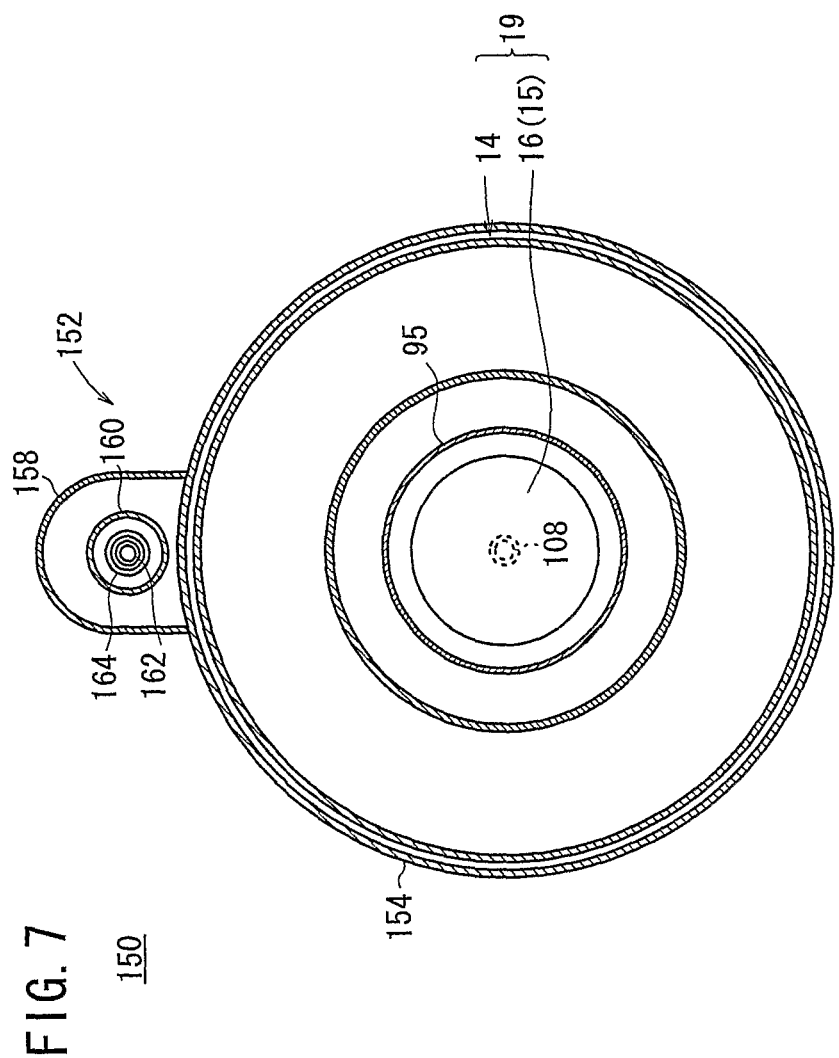
FIG. 7 is a cross sectional view showing the fuel cell system taken along a line VII-VII in FIG. 6.

FIG. 6 is a partial cross sectional view showing a fuel cell system 150 according to a second embodiment of the present invention. FIG. 7 is a cross sectional view showing the fuel cell system 150 taken along a line VII-VII in FIG. 6. The constituent elements of the fuel cell system 150 that are identical to those of the fuel cell system 10 according to the first embodiment are labeled with the same reference numeral, and description thereof will be omitted. Further, in a third embodiment as described later, the constituent elements that are identical to those of the fuel cell system 10 according to the first embodiment are labeled with the same reference numeral, and description thereof will be omitted.

In the fuel cell system 150, a combustor 152 is provided around the second case unit 84b. The combustor 152 has a case unit 154 formed around shoulder portion of the second case unit 84b. A substantially ring shaped combustion gas chamber 156 is formed between the case unit 154 and the second case unit 84b. An outer plate 158 having a U-shape in cross section is fixed to part of the outer circumference of the second case unit 84b and the case unit 154. Further, a cover 160 is disposed in the outer plate 158 (see FIG. 7). Since the combustor 152 includes the single cylindrical cover 160, for the purpose of improving heat insulating performance, a dual wall section is formed by the case unit 154 and the second case unit 84b.

A raw fuel supply pipe 162 and an air supply pipe 164 having dual pipe structure are connected to an end of the cover 160 on the side of the head plate 90. At an outlet of the cover 160, a combustion gas path 165 is provided. The combustion gas path 165 is connected to a merger section 122 through a plurality of holes 166 formed in the second case unit 84b.

In the second embodiment, at the time of starting operation of the fuel cell system 150, combustion is performed in the combustor 152. The combustion gas produced by the combustion flows through the combustion gas path 165 into the combustion gas chamber 156, and then, the combustion gas is supplied to the merger section 122 through the holes 166.

The exhaust gas from the exhaust gas path 92 is supplied to the merger section 122. Thus, the mixed gas of the combustion gas and the exhaust gas is supplied to the heat exchanger 14. Therefore, it is possible to suitably regulate the temperature of the heat medium supplied to the heat exchanger 14. The combustion gas chamber 156 is formed around the fluid unit 19, and thus, the same advantages as in the case of the first embodiment are obtained. For example, improvement in heat insulation performance of the fluid unit 19 is achieved effectively.

Figure 8:
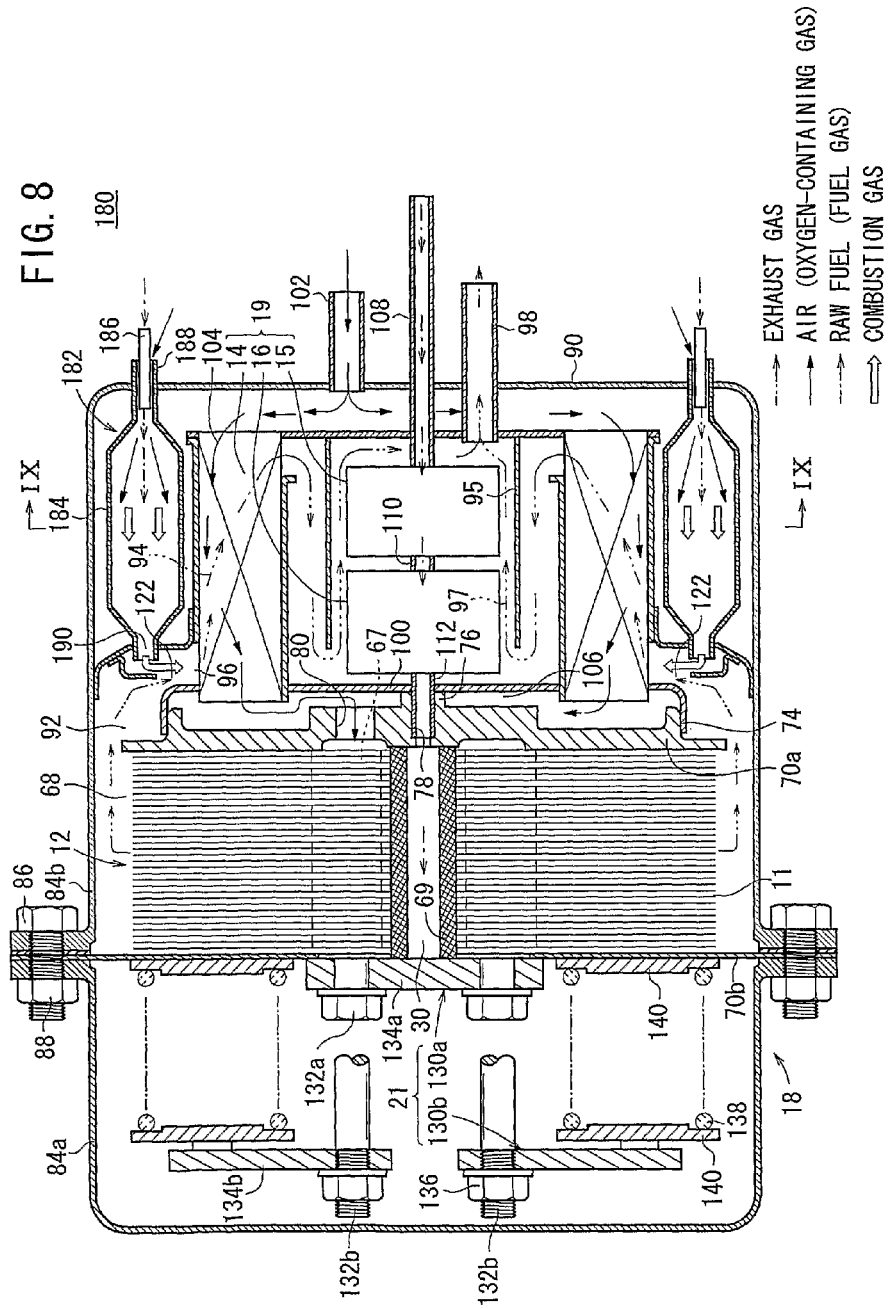
FIG. 8 is a partial cross sectional view showing a fuel cell system according to a third embodiment of the present invention.
Figure 9:
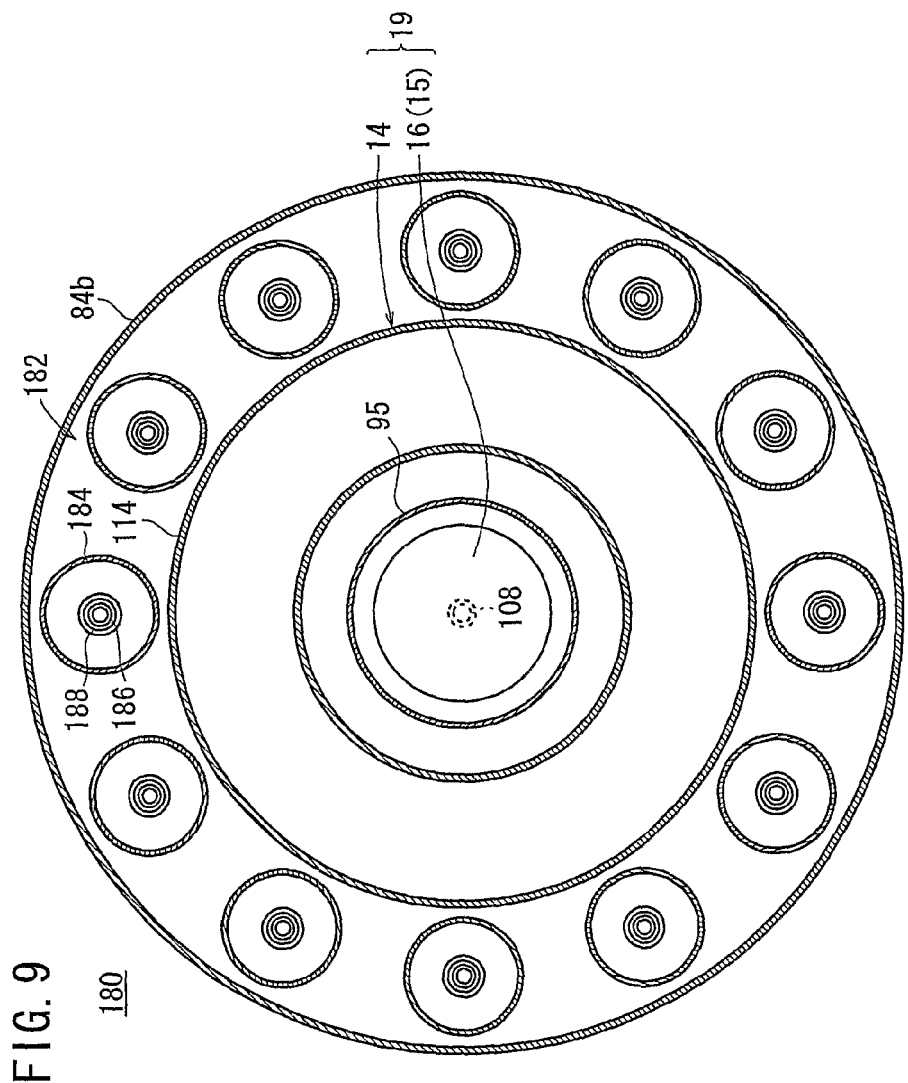
FIG. 9 is a cross sectional view showing the fuel cell system taken along a line IX-IX in FIG. 8.
Figure 10:
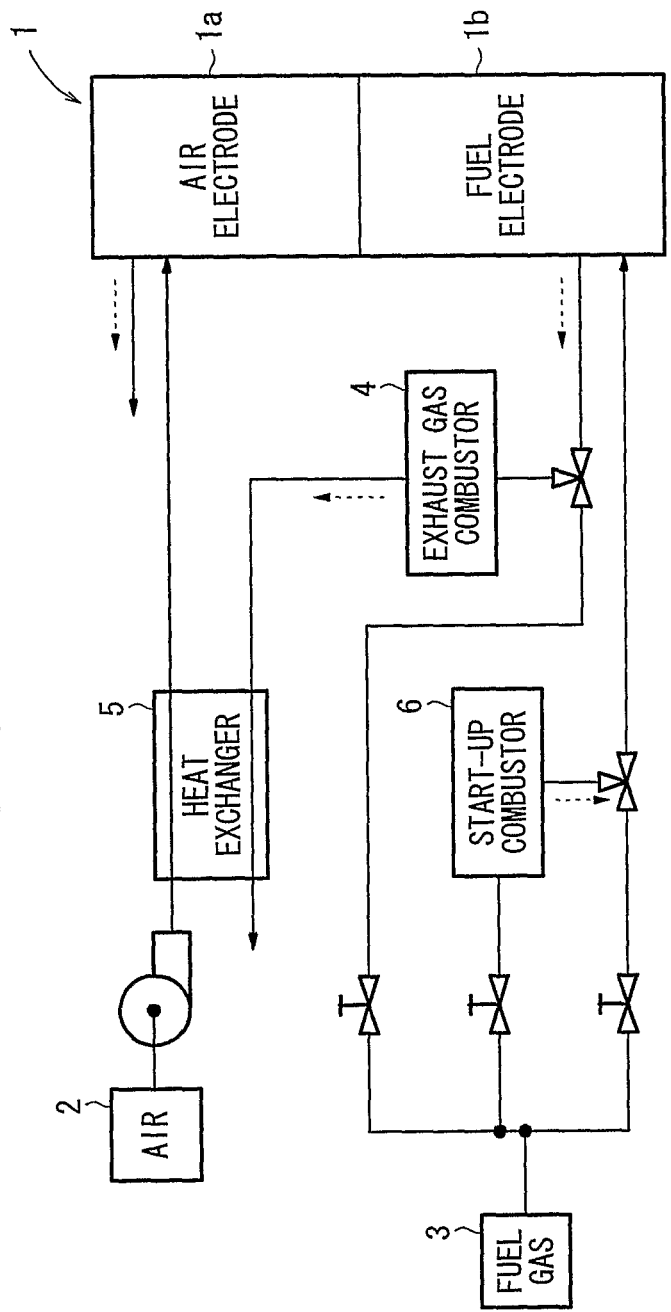
FIG. 10 is a cross sectional view showing a fuel cell system disclosed in Japanese Laid-Open Patent Publication No. 2005-166439.

FIG. 8 is a partial cross sectional view showing a fuel cell system 180 according to the third embodiment of the present invention. FIG. 9 is a cross sectional view showing the fuel cell system 180 taken along a line IX-IX in FIG. 8.

The fuel cell system 180 includes a combustor 182, and the combustor 182 has a plurality of covers 184 provided around the heat exchanger 14 of the fluid unit 19. The covers 184 are arranged along a same circle concentrically with the central axis of the fuel cell stack 12. Each of the covers 184 has a raw fuel supply pipe 186 and an air supply pipe 188 having dual pipe structure. At the outlet of the covers 184, a combustion gas path 190 is provided. The combustion gas path 190 is merged with the exhaust gas path 92 at the merger section 122.

Thus, in the third embodiment, the covers 184 are provided around the heat exchanger 14, and the combustion gas path 190 and the exhaust gas path 92 are merged at the merger section 122. In the structure, the same advantages as in the case of the first and second embodiments are obtained.

The invention claimed is:

1. A fuel cell system comprising:
   a fuel cell stack formed by stacking a plurality of fuel cells, said fuel cells each being formed by stacking an electrolyte electrode assembly and a separator, said electrolyte electrode assembly including an anode, a cathode, and an electrolyte interposed between said anode and said cathode;
   a heat exchanger for heating an oxygen-containing gas using a heat medium before the oxygen-containing gas is supplied to said fuel cell;
   a reformer for reforming a raw fuel chiefly containing hydrocarbon to produce a fuel gas to be supplied to said fuel cell stack;
   a combustor for burning the raw fuel to produce a combustion gas, wherein the combustor includes a combustor cover, and
   a fluid unit including an evaporator for evaporating water to produce a mixed fuel of the raw fuel and water vapor and at least said heat exchanger and said reformer are provided at one end of said fuel cell stack in the stacking direction,
   wherein said heat exchanger is separate and distinct from said evaporator and said heat exchanger is positioned relative thereto so as to surround the evaporator,
   wherein said combustor, said heat exchanger, and said reformer and evaporator are arranged concentrically such that:
      said combustor cover is disposed about said heat exchanger in the radial direction and positioned relative thereto so as to form a space therebetween, and
      said heat exchanger is provided around said reformer and said evaporator in the radial direction such that said reformer and said evaporator are provided inside of said heat exchanger, and near said fuel cell stack, wherein said evaporator is disposed adjacent to said reformer,
   said fuel cell system further comprising:
      a combustion gas path for supplying the combustion gas produced in said combustor to said heat exchanger as the heat medium;
      an exhaust gas path for supplying an exhaust gas discharged from said fuel cell stack after consumption in power generation reaction to said heat exchanger as the heat medium;
      a merger section provided directly on an upstream side of a heat medium inlet of the heat exchanger for supplying the heat medium to said heat exchanger, the heat medium inlet being directly connected to the exhaust gas path, said combustion gas path and said exhaust gas path being merged at said merger section to produce a mixed gas of the combustion gas and the exhaust gas, wherein said combustor is provided around said heat exchanger in a radial direction, said combustor extending in an axial direction from one end of the heat exchanger on a side opposite to the merger section to the other end of the heat exchanger, such that the heat exchanger is disposed spatially inwardly of said combustor,
      a head plate positioned so as to surround the combustion cover, and
      one or more guide plates positioned between the heat exchanger and the evaporator and reformer such that the mixed gas is directed around the evaporator and reformer in a serpentine fashion.

2. A fuel cell system according to claim 1, wherein said fluid unit is provided symmetrically with respect to the central axis of said fuel cell stack.

3. A fuel cell system according to claim 1, further comprising a casing accommodating said fuel cell stack and said fluid unit, wherein a load applying mechanism for applying a tightening load to said fuel cell stack in the stacking direction is provided in said casing at another end of said fuel cell stack in the stacking direction.

4. A fuel cell system according to claim 3, wherein said load applying mechanism is provided symmetrically with respect to the central axis of said fuel cell stack.

5. A fuel cell system according to claim 1, wherein said combustor cover is substantially ring shaped.

6. A fuel cell system according to claim 1, wherein said combustor further comprises a dual wall section formed around said heat exchanger.

7. A fuel cell system according to claim 1, wherein said combustor comprises a plurality of covers formed around said heat exchanger.

8. A fuel cell system according to claim 7, wherein each of said plurality of covers includes a raw fuel supply pipe and an air supply pipe having a dual pipe structure.

* * * * *